March 5, 1963 W. J. OBERLEY ETAL 3,080,212
TREATMENT OF WOOD WITH HOT CHROMATED COPPER ARSENATE SOLUTIONS
Filed Dec. 12, 1961
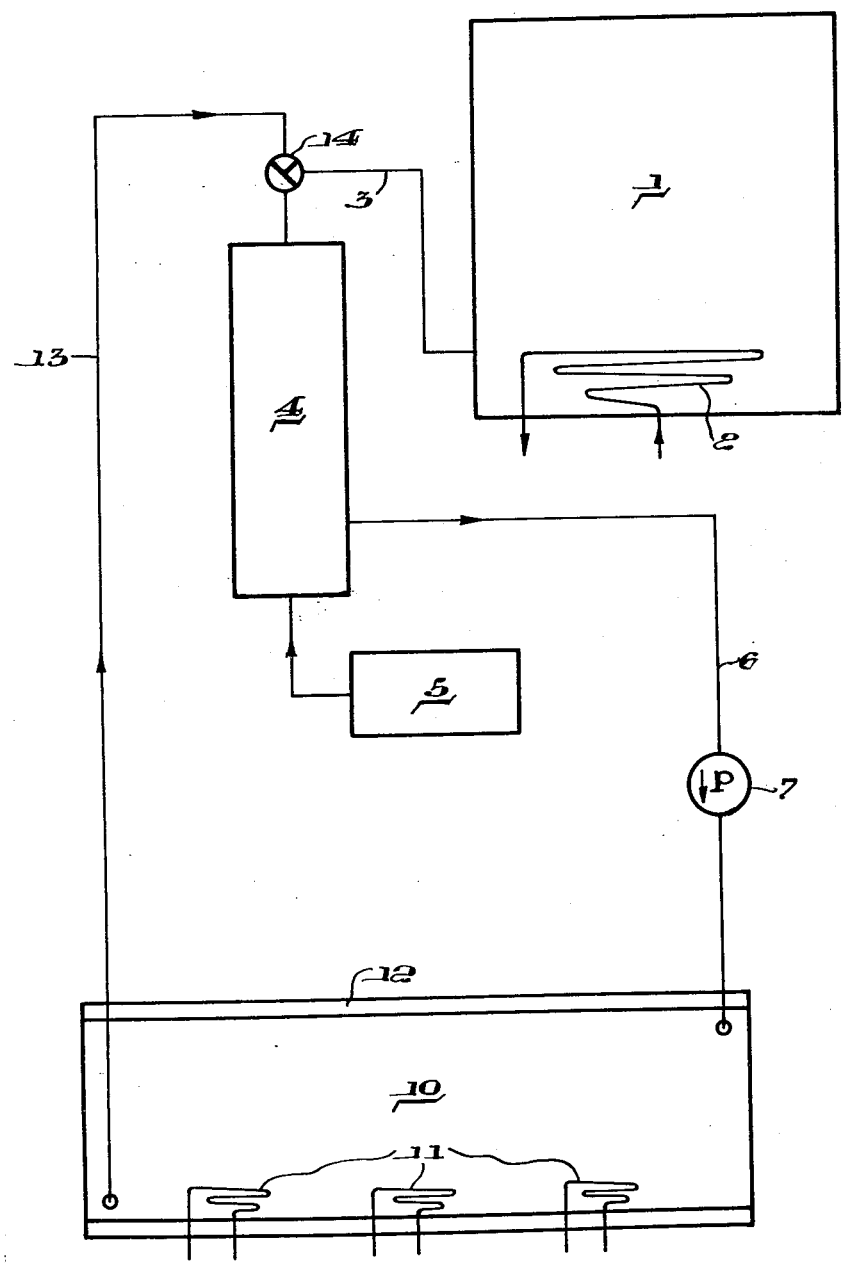
INVENTORS
IRVING S. GOLDSTEIN,
WILLIAM J. OBERLEY.
BY J.E. Armstrong.
their ATTORNEY.

3,080,212
TREATMENT OF WOOD WITH HOT CHROMATED COPPER ARSENATE SOLUTIONS
William J. Oberley, Monroe Heights, Pitcairn, and Irving S. Goldstein, Pittsburgh, Pa., assignors to Koppers Company, Inc., a corporation of Delaware
Filed Dec. 12, 1961, Ser. No. 158,853
7 Claims. (Cl. 21—7)

This invention relates to an improvement in a process for treating wood with a preservative solution in which chemical changes occur causing precipitation of difficultly soluble substances after introduction of the solution into the wood to be impregnated. In one specific aspect, it relates to a process for treating wood with a hot chromated copper arsenate solution stabilized with ozone to prevent formation of a precipitate while the solution is impregnating the wood.

Chromated copper arsenate solutions are particularly effective preservatives for prevention of decay and deterioration of wood. Wood impregnated with this solution becomes resistant to decay and attack by termites while, at the same time, the active ingredients are resistant to weathering and leaching when the wood is in contact with the ground or water, and the treated wood is adapted for reception of surface coatings such as paint. Statistics compiled by the United States Department of Agriculture, in Handbook No. 72, shows that treatment is effective for a considerable length of time. One source of chromated copper arsenate is commercially available under the trademark Erdalith.

Heretofore, chromated copper arsensate solutions were applied by the cold method whereby cold solutions were applied on cold wood. Usually wood to be treated, received in green condition, does not accept treatment readily. The wood must be seasoned by placing it in a cylinder and steam drying to reduce the moisture content. It is then removed from the cylinder and stacked for cooling. After cooling to ambient temperature, the wood is returned to the cylinder where it is cold impregnated with the chromated copper arsenate solution under pressure from 4 to 8 hours. The treated wood is then air or kiln dried and is ready for use.

The cold treatment method has many serious disadvantages: (1) There is incomplete and nonuniform penetration of the cold solution into the cold wood resulting in unsatisfactory treatment of a considerable percentage of the lumber treated; (2) after the wood is seasoned by steaming, it is unnecessary to remove the charge from the cylinder for cooling and thereafter return it to the cylinder for treatment resulting in loss of time and labor; (3) reducing sugars are gradually extracted from the wood eventually causing formation of a sludge or precipitate in the solution.

Attempts were made to overcome the difficulties of the cold method by impregnating the wood with a hot solution. It was anticipated that a hot solution would give improved penetration because of the decrease in viscosity of the aqueous solution (e.g. absolute viscosity of water at 25° C. is about 0.5 and at 80° C. is about 0.2). The hot method also would make the removal of the charge from the cylinder after steam treatment unnecessary.

However, previous attempts to treat the wood with a hot chromated copper arsenate solution were unsuccessful. When wood was treated with a hot solution, polysaccharides found in the wood were hydrolyzed to reducing sugars which were rapidly extracted into the solution. These reacted with the chromated copper arsenate to form difficultly soluble salts as sludge or precipitate which coated the surface of the wood clogging the pores and preventing further penetration.

A brief explanation of the chemistry of what occurs when wood is treated with a chromated copper arsenate solution is necessary to understand our invention. The chromated copper arsenate is a mixture of potassium dichromate, copper sulfate and arsenic acid. A solution of this mixture used to impregnate wood, reacts inside the wood with reducing sugars found therein to form a mixture of insoluble salts. Although a complex reaction is involved, for purposes of simplification, it may be considered as a reduction of the dichromate ion to the chromic ion expressed by the following equation:

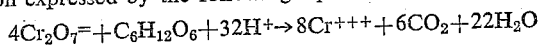

The reduced chromic ion reacts with other salts in solution to form an insoluble precipitate as, for example:

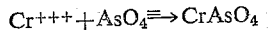

Heretofore, attempts at using oxidizing agents stronger than dichromate to prevent the formation of sludge by reacting with the reducing sugars extracted from the wood have been unsuccessful because of harmful side effects. Persulfate is unacceptable because it is unstable in acid, decomposes during treatment and storage, increases the acidity of the solution on decomposing to sulfuric acid, degrades the wood, and is corrosive to the equipment used. Permanganate is equally unacceptable because on reduction, the manganese dioxide formed, stains and degrades the wood, and forms a sludge which cannot be tolerated. Perchlorate, also unacceptable, decomposes to hydrochloric acid which degrades the wood and is corrosive to equipment.

Quite surprisingly, we have discovered a new, successful method for treating wood with a hot chromated copper arsenate solution stabilized by the addition of ozone. When the wood is treated according to our process, we have been able to obtain complete and uniform penetration of the solution into the wood, save time and labor by making removal of the charge from the treating chamber unnecessary, and prevent formation of a precipitate in the solution during impregnation. At the same time, we have obtained no harmful side effects such as degradation of the wood, corrosion of equipment, increased acidity, staining of the wood, and addition of salt to the treating solution.

It is therefore an object of our invention to provide a new method for treating wood with a hot chromated copper arsenate solution.

It is another object of our invention to provide an improved method of impregnatnig wood with chromated copper arsenate to effect complete and uniform penetration of the treating solution into the wood.

It is a further object of our invention to provide a new method of stabilizing a hot chromated copper arsenate solution in the presence of reducing sugars.

In accordance with the invention, we have discovered a new method of treating wood with a hot solution of chromated copper arsenate whereby precipitation of difficultly soluble salts by reducing sugars extracted from the wood is prevented until the wood is completely and uniformly impregnated with the hot treating solution at a temperature above 60° C. and at wood impregnating pressure by adding ozone to the hot treating solution.

Ozone, having the chemical formula $O_3$, is a very powerful oxidizing agent. Ordinarily, in an acid solution one of the oxygens is reduced to water and the other two are liberated as molecular oxygen. Its outstanding features are that it has no effect on the pH or the salt content of the treating solution and is easily removed after the treatment is terminated. The ozone, used to treat the hot solution in our invention may be supplied by any commercial source, such as an ozone generator. From the generator the ozone gas passes through a column containing the hot treating solution. The amount of ozone retained by the treating solution is determined by the length of the column and by the size of the gas bubbles passing into the solution. Both these factors must be considered and adjusted to produce optimum conditions. The treating solution should initially contain ozone and it is preferable to saturate the hot solution with this gas. As is explained hereinafter, fresh ozonated solution is continuously passing into the treating cylinder while spent solution is returned for resaturation with ozone whereby fresh ozonated solution is continuously recycled into the treating cylinder.

Standards set forth by the American Wood Preserving Association for chromated copper arsenate are as follows:

| | Percent min. |
|---|---|
| Hexavalent chromium calculated as $K_2Cr_2O_7$ | 50 |
| Copper calculated as $CuSO_4 \cdot 5H_2O$ | 30 |
| Pentavalent arsenic calculated as $As_2O_5 \cdot 2H_2O$ | 10 |

A typical formulation of dry chromated copper arsenate is prepared under the trademark Erdalith, using:

| | Parts |
|---|---|
| Sodium arsenate | 10 |
| Arsenic acid | 5 |
| Potassium dichromate | 33.5 |
| Anhydrous copper sulfate | 21 |

The formulation is mixed with water to form a solution. When used as a wood preservative the strength of the solution commonly used varies from 2 to 5 percent. Using a solution containing less than 1 percent chromated copper arsenate is ineffective, whereas using a solution greater than 10 percent is unnecessarily wasteful and may create problems of solubility.

The pressure under which the treatment is conducted depends on the particular wood to be impregnated. Some kinds of wood may require slight pressure, whereas in others greater pressure may be required. However, the pressure should not be so great that the wood becomes degraded. Useful wood impregnating pressures range between about 50 and 200 p.s.i. and a pressure of about 150 p.s.i. is preferred for our invention. These pressures may be varied to permit the use of either the full cell or the empty cell process.

The effective temperature range of our invention is between 60° and 100° C. and the particular temperature must be adjusted to the treating pressure and the wood being treated. The preferred temperature is about 80° C.

The time required for complete penetration varies with the type of wood, the temperature and pressure. Usually 4 to 12 hours produce satisfactory results.

The accompanying drawing is only for purpose of illustration and shows an embodiment of the invention. The drawing shows, in simplified form, a system for treating wood with a hot preserving solution through which ozone is bubbled.

Referring to the drawing, prepared and mixed chromated copper arsenate solution is placed in the reservoir 1 and the solution is heated to the treating temperature by the heating coils 2 heated by suitable means not shown. The hot solution passes through the conduit 3 into the ozone column 4 and is saturated with ozone produced by the ozone generator 5. The hot ozonated solution passes through the conduit 6 and is forced under pressure produced by the pump 7 into the treating cylinder 10. The temperature of the treating solution is maintained by heating coils 11 placed inside the treating cylinder 10 and heated by suitable means not shown. An insulation jacket 12 may be used to insulate the treating cylinder 10. The hot spent treating solution passes out of the heating cylinder 10 through the conduit 13 into the ozone column 4 wherein the treating solution is resaturated with ozone, and forced back into the cylinder 10 for continuous cycling of the solution. When the hot solution is transferred from the reservoir 1 through the conduit 3, it passes through the three-way valve 14, which is positioned so that the hot solution passes only into the ozone column 4. Once the desired amount of solution has been transferred from the reservoir 1, the three-way valve 14 is closed to the conduit 3 from the reservoir 1 and is opened to conduit 13 to permit the continuous passage of the spent solution from the treating cylinder 10 into the ozone column 4. After the treating cycle has been completed, the valve 14 is positioned so that solution from the treating cylinder 10 may pass back into the reservoir 1 and stored for further use.

Our invention is further illustrated by the following examples.

Example I.—Control Sample

A piece of southern yellow pine having the dimensions 2″ x 2″ x 8″ was steam dried for one hour at 110° C. After drying, it was immediately immersed in a stainless steel pan containing 1175 ml. of a 4 percent aqueous solution of chromated copper arsenate heated to a temperature of 80° C. The wood was impregnated for 3 hours at a pressure of 150 p.s.i. keeping the temperature constant at 80° C. by placing the treating pan in a thermostatically controlled pressure chamber. At intervals during the impregnation, the wood and the apparatus were inspected. It was observed that sludge began to form on the surface of the sample and in the solution about five minutes after the wood was immersed in the solution. A test of the pH of the treating solution after treatment showed that it had increased from the initial pH of 2.0 to 3.7.

Example II

The procedure of Example I was repeated except that the treating solution was modified by the addition of 11.75 g. of $K_2S_2O_8$ (1.0 g. $K_2S_2O_8$ per 100 ml. solution). Although no precipitate was observed in the final solution, the color of the solution during treatment gradually changed from yellow to dark green. The pH of the final solution had decreased to 1.2 from 2.0. The color change is the result of the reduction of $Cr_2O_7^= \rightarrow Cr^{+++}$ which is explained by the fact that persulfate is destroyed by heating and thereafter the extracted reducing sugars act on the dichromate. The reduced chromate salts do not however form a precipitate because of the increased acidity.

Example III

The procedure of Example I was repeated except that the treating solution was modified by the addition of 11.75 g. of $KClO_4$ (1.0 g. $KClO_4$ per 100 ml. solution). Results were that the color of the solution changed from yellow to green with no formation of precipitate. However the pH decreased from 2.0 to 0.9 which is explained by the decomposition of $KClO_4$ to hydrochloric acid.

Example IV

The procedure of Example I was repeated except that the treating solution was modified by the addition of 11.75 g. $KMnO_4$ (1.0 g. $KMnO_4$ per 100 ml. solution). It was observed that the sample slowly turned purple and considerable amounts of brown precipitate formed in the solution. The pH of the solution decreased from 2.0 to 1.3. The brown precipitate is explained by the reduction of $KMnO_4$ to $MnO_2$.

Example V

The procedure of Example I was repeated except that the solution was modified by continuously passing ozone through the treating process. Some of the treating solution was continuously cycled through an ozone column into which ozone, produced by an ozone generator, was bubbled. The ozonated solution was then transferred into the treating pan while at the same time spent solution was returned to the ozone column. Ozonation was continued throughout the treatment. Results showed no precipitation, no change in the color of the treating solution, and no change in the pH of the solution during the treatment. The wood sample was inspected and showed complete and uniform impregnation.

We claim:
1. A method of treating wood with a hot preservative solution, whereby reducing sugars extracted from the wood, are neutralized to prevent precipitation of difficultly soluble salts in the solution which comprises contacting the wood, at a temperature above 60° C. and under a pressure of 50 to 200 p.s.i.g. with a 1 to 10 percent solution of chromated copper arsenate stabilized with ozone until the wood is thoroughly impregnated with the hot preservative solution.

2. The method according to claim 1, wherein the temperature is about 80° C. and the pressure is about 150 p.s.i.g.

3. The method according to claim 1, wherein the treating solution contains from 2 to 5 percent chromated copper arsenate.

4. In a method for treating wood with a preservative solution wherein the wood is impregnated under wood impregnating pressures with a 1 to 10 percent chromated copper arsenate solution whereby reducing sugars are extracted from the wood, the improvement comprising treating the wood with a hot chromated copper arsenate solution at a temperature above 60° C. and stabilizing said hot solution by saturating with ozone to maintain chromated copper arsenate in solution until the wood has been thoroughly impregnated with said hot solution.

5. The method according to claim 4 wherein the temperature is about 80° C. and the pressure is about 150 p.s.i.g.

6. A method according to claim 4, wherein the treating solution contains from 2 to 5 percent chromated copper arsenate.

7. A method for treating wood with a hot preservative solution comprising the steps of:
(a) heating a 1–10 percent aqueous solution of chromated copper arsenate to a temperature above 60° C.,
(b) saturating said hot solution with ozone,
(c) transferring said hot solution to a treating cylinder under wood treating pressure of about 150 p.s.i.,
(d) contacting wood to be impregnated with said hot solution whereby reducing sugars are extracted from said wood.
(e) maintaining the temperature of said treating solution above 60° C.,
(f) removing said solution from the treating cylinder,
(g) resaturating said solution with ozone,
(h) recycling said resaturated solution to said wood, and
(i) continuing this process until the wood is thoroughly impregnated.

References Cited in the file of this patent
UNITED STATES PATENTS

| | | |
|---|---|---|
| 2,202,579 | Hager | May 28, 1940 |
| 2,366,612 | Hager | Jan. 2, 1945 |
| 2,565,175 | Hager | Aug. 21, 1951 |

UNITED STATES PATENT OFFICE

CERTIFICATE OF CORRECTION

Patent No. 3,080,212            March 5, 1963

William J. Oberley et al.

It is hereby certified that error appears in the above numbered patent requiring correction and that the said Letters Patent should read as corrected below.

Column 1, line 49, for "unnecessary" read -- necessary --.

Signed and sealed this 21st day of April 1964.

(SEAL)
Attest:

ERNEST W. SWIDER
Attesting Officer

EDWARD J. BRENNER
Commissioner of Patents